June 3, 1952  E. B. OSBORN  2,599,066

WINDSHIELD COVER FOR AUTOMOBILES

Filed Dec. 11, 1950

INVENTOR.
Edwin B. Osborn
BY
ATTORNEY.

Patented June 3, 1952

2,599,066

UNITED STATES PATENT OFFICE 2,599,066

WINDSHIELD COVER FOR AUTOMOBILES

Edwin B. Osborn, Kansas City, Mo.

Application December 11, 1950, Serial No. 200,157

1 Claim. (Cl. 160—368)

This invention relates to automobile accessories and more particularly to a cover for the windshield thereof having means adapted for clamping between certain doors of the automobile and the frame thereof to hold the cover in place.

It is the most important object of the present invention to provide a windshield cover that includes an elongated fabric panel, together with means in the nature of suction cups conveniently disposed thereon to facilitate in the placement of the cover upon the windshield while the doors are moved into a closed position clamped against certain parts of the device to hold the fabric panel in a taut condition.

It is an object of this invention to provide an automobile windshield cover of a fabric material co-extensive in size with the windshield to be covered and having a plurality of elongated straps at the ends thereof, the uppermost straps being provided with suction cups adapted to grip the windshield on the inner face thereof whereby to hold the cover in place on the windshield while the operator adjusts the cover to properly position the same and closes the automobile doors to clamp the cover in place.

A still further object of this invention is to provide a cover having suction cups at the lowermost longitudinal edges thereof adapted to grip the automobile body adjacent the windshield for further facilitating the placement of the cover on the windshield.

Figure 1:
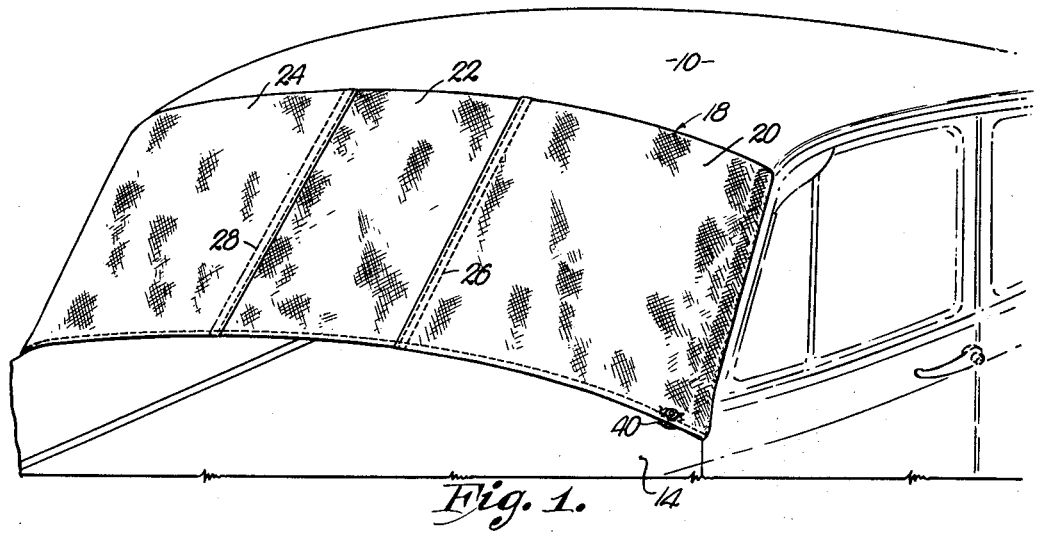
Figure 1 is a front perspective view of a windshield cover for automobiles made according to my present invention.
Figure 2:
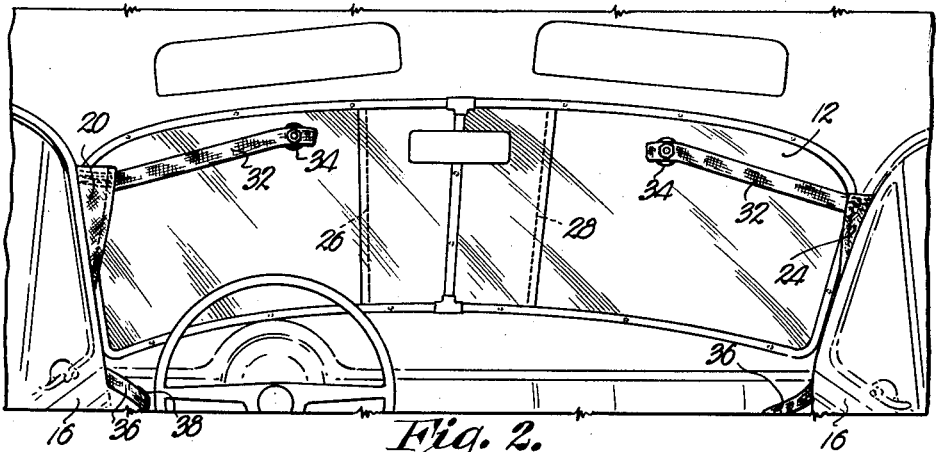
Fig. 2 is an inside view of an automobile looking outwardly through the windshield and showing my cover operably mounted thereon.
Figure 3:
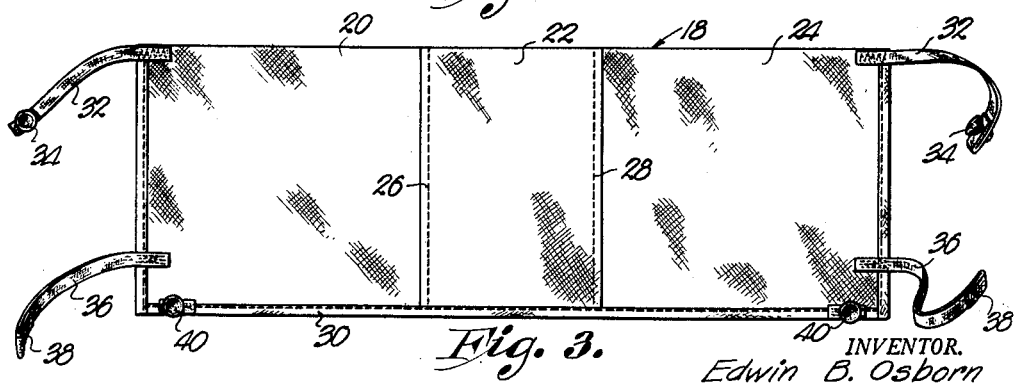
Fig. 3 is an elevational view of the normally innermost face of the windshield cover per se.

In Figs. 1 and 2 of the drawing, there is illustrated an automobile body broadly designated by the numeral 10, including a windshield 12, a hood 14 and a pair of front doors 16. The cover forming the subject matter of the present invention and adapted to overlie the outermost face of windshield 12 includes an elongated fabric panel, broadly designated by the numeral 18 that is substantially rectangular as illustrated in Fig. 3 of the drawing and may constitute a single strip of material if desired. However, in the present modification, panel 18 is composed of three sections 20, 22 and 24, stitched together as at 26 and 28.

It is also desirable that a hem 30 be formed at the periphery of the panel 18 along at least certain of the edges thereof. In any event, the panel 18 is co-extensive in size with the windshield 12 to fully cover the latter when in an operative position as illustrated in Figs. 1 and 2 and is cut and shaped to accommodate the particular automobile and windshield with which it is to be used.

Panel 18 is provided with a pair of elongated, flexible straps 32 at the uppermost longitudinal edge thereof and extending outwardly from each end respectively. One end of each strap 32 is stitched or otherwise rigidly secured to the panel 18 and the outermost free end of each strap 32 is rebent upon itself to receive a suction cup 34.

A pair of lowermost straps 36 of fabric material or other flexible substance, is provided for the panel 18 adjacent the lowermost longitudinal edge thereof but spaced thereabove as illustrated in Fig. 3 of the drawing. Straps 36 are likewise stitched rigidly to the panel 18 and have the outermost free ends thereof rebent and stitched as at 38.

A pair of suction cups 40 secured directly to the panel 18 at the lowermost longitudinal edge thereof, are preferably joined to hem 30 near the lowermost corners of the panel 18. When panel 18 is placed upon the windshield 12, the uppermost corners of the panel 18, as well as the straps 36, extend between the proximal door 16 and the body 10 in the manner illustrated in Fig. 2 of the drawing, whereby upon closing of the doors 16, such uppermost corners and the straps 36 are clamped tightly in place.

It is difficult however, to hold the flexible panel 18 in place upon the windshield 12 while closing the doors 16 into the clamping relationship with the cover. Accordingly, during the mounting operation, both of the doors 16 are opened and straps 32 are extended to a position entirely within the body 10. The suction cups 34 are thereupon placed into gripping relationship with the windshield 12 on the innermost face thereof as illustrated in Fig. 2 of the drawing, thereby temporarily holding the uppermost longitudinal edge of the panel 18 in place along the body 10 above the upper edge of windshield 12. The operator also, during the initial mounting operation, causes the suction cups 40 to tightly grip the hood 14 of body 10 immediately below the lower edge of windshield 12, the four suction cups 34 and 40 thereby cooperating in the temporary mounting of cover 18 on windshield 12. With the uppermost corners of the panel 18 and the straps 36 in position, the operator closes both of the doors 16 and the entire cover is mounted in a taut condition across the outer face of windshield 12. Because of the gripping action of the doors 16 and the body 10 upon the panel 18 and the straps 36, the entire cover will be held in place separate from the action of the cups 34 and 40 and even if the latter have a tendency to lose their grip, panel 18 cannot become displaced from the windshield 12. As long as the doors 16 remain in a closed condition, the windshield 12 is fully protected against rain, snow and freezing action, and the cover 18 cannot become displaced or maladjusted by the action of wind.

It is obvious that the entire device may be manufactured inexpensively, can be easily rolled or folded into a small, compact bundle for storage within the automobile when not in use, and because of the features hereinabove set forth, the mounting and removal of the cover is rendered a simple and speedy task.

Having thus described the invention what is claimed as new and desired to be secured by Letters Patent is:

A cover for automobile windshields comprising a rectangular, fabric panel having a size greater than the size of a windshield to be covered adapting the same to extend from one front automobile door to the other front automobile door beyond the windshield; a lowermost elongated fabric strap at each end of said panel; an uppermost elongated fabric strap at each end of said panel, said lowermost straps and the uppermost corners of the panel being adapted to extend between the proximal front automobile door and the frame thereof for clamping therebetween upon closing of the doors with the uppermost straps entirely within the automobile body, whereby to hold the panel taut over said windshield, the ends of the panel between said corners and the lowermost straps terminating adjacent the forwardmost vertical edges of said doors; a suction cup on the outermost free end of each uppermost strap and adapted to grip the inner face of said windshield to temporarily hold said panel in place over the windshield while closing the doors on said corners and said lowermost straps; and a suction cup on the panel adjacent each lowermost corner thereof and adapted to grip the automobile body below the windshield to further aid in temporarily holding the panel in place.

EDWIN B. OSBORN.

REFERENCES CITED

The following references are of record in the file of this patent:

UNITED STATES PATENTS

| Number | Name | Date |
|---|---|---|
| 2,065,242 | Omerly | Dec. 22, 1936 |
| 2,331,600 | Dillow | Oct. 12, 1943 |
| 2,437,845 | Wyeth | Mar. 16, 1948 |